(12) United States Patent
Xu et al.

(10) Patent No.: US 11,856,312 B2
(45) Date of Patent: Dec. 26, 2023

(54) IMAGE PROCESSING METHOD, APPARATUS, ELECTRONIC DEVICE AND STORAGE MEDIUM

(71) Applicant: Beijing Xiaomi Mobile Software Co., Ltd., Beijing (CN)

(72) Inventors: Jing Xu, Beijing (CN); Lei Miao, Beijing (CN); Yan Yi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 71 days.

(21) Appl. No.: 17/453,782

(22) Filed: Nov. 5, 2021

(65) Prior Publication Data

US 2022/0239846 A1      Jul. 28, 2022

(30) Foreign Application Priority Data

Jan. 27, 2021    (CN) .......................... 202110112806.X

(51) Int. Cl.
*H04N 5/262*     (2006.01)
*H04N 19/88*    (2014.01)
*H04N 23/69*    (2023.01)
*H04N 23/695*   (2023.01)

(52) U.S. Cl.
CPC ........... *H04N 5/2621* (2013.01); *H04N 19/88* (2014.11); *H04N 23/69* (2023.01); *H04N 23/695* (2023.01)

(58) Field of Classification Search
CPC ...... H04N 5/2621; H04N 19/88; H04N 23/69; H04N 23/695; H04N 5/2625; H04N 5/2628; H04N 23/80; G06T 3/4092; G06T 7/97; G06T 2207/10016
See application file for complete search history.

(56) References Cited

U.S. PATENT DOCUMENTS

2014/0240553 A1     8/2014    Pylvanainen et al.
2021/0120171 A1*   4/2021    Yasuda .................. H04N 23/54

FOREIGN PATENT DOCUMENTS

| CN | 109379537 A | 2/2019 |
| CN | 112087579 A | 12/2020 |
| WO | 2018093002 A1 | 5/2018 |

* cited by examiner

*Primary Examiner* — Christopher K Peterson
(74) *Attorney, Agent, or Firm* — McCoy Russell LLP

(57) ABSTRACT

An image processing method can include: acquiring a plurality of image frames obtained by photographing for a subject and a plurality of photographing state parameters respectively adopted when photographing the plurality of image frames, the subject being located at a same position of each image frame; determining a zoom ratio corresponding to the plurality of photographing state parameters respectively according to a preset corresponding relationship between the photographing state parameters and the zoom ratio; zooming corresponding image frames according to the determined zoom ratio to obtain a plurality of target image frames, and encoding the obtained plurality of target image frames into a video file.

13 Claims, 7 Drawing Sheets

IMAGE PROCESSING METHOD, APPARATUS, ELECTRONIC DEVICE AND STORAGE MEDIUM

CROSS-REFERENCE TO RELATED APPLICATION

The present application claims priority to Chinese Patent Application No. 202110112806.X, filed on Jan. 27, 2021. The entire contents of the above-listed application are hereby incorporated by reference for all purposes.

BACKGROUND

Hitchcock zoom, also known as moving zoom or sliding zoom, is an advanced photographing technique in the field of video photographing. It mainly changes the focal length while pushing and pulling the camera position, so that the visual effect that the subject is roughly unchanged but the background space is compressed or enlarged appears in the photographed video, thus creating anxiety, panic and other emotions for the viewers. This kind of video effect produced by Hitchcock zoom is called Hitchcock effect.

SUMMARY

The disclosure relates to the field of image processing, and to an image processing method, an apparatus, an electronic device and a storage medium.

The disclosure provides an image processing method, an apparatus, an electronic device and a storage medium.

According to a first aspect of the disclosure, an image processing method is provided, which includes: acquiring a plurality of image frames obtained by photographing for a subject and a plurality of photographing state parameters respectively adopted when photographing the plurality of image frames, the subject being located at a same position of each image frame; determining a zoom ratio corresponding to the plurality of photographing state parameters respectively according to a preset corresponding relationship between the photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and zooming corresponding image frames according to the determined zoom ratio to obtain a plurality of target image frames, and encoding the obtained plurality of target image frames into a video file.

According to a second aspect of the disclosure, an electronic device is provided, which includes: a processor; and a memory for storing processor executable instructions; wherein the processor implements the image processing method as described in the first aspect by operating the executable instructions.

According to a third aspect of the disclosure, a non-transitory computer-readable storage medium having computer instructions stored thereon that, when executed by a processor, implement the image processing method as described in the first aspect.

BRIEF DESCRIPTION OF THE DRAWINGS

Accompanying drawings here, which are incorporated in and constitute a part of this specification, illustrate embodiments in conformity with the disclosure, and together with the description, serve to explain the principles of the disclosure.

DETAILED DESCRIPTION

Figure 1:
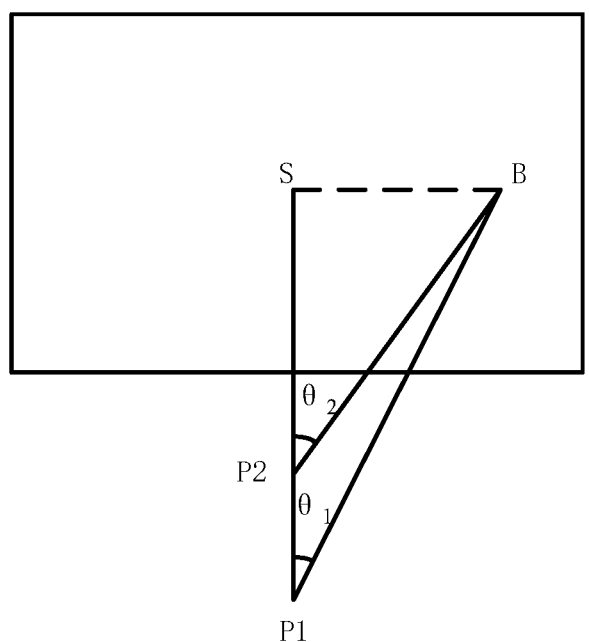
FIG. 1 is a schematic diagram of an imaging principle shown in some embodiments of the disclosure.

Some embodiments, examples of which are shown in the drawings, will be explained in detail here. When the following description relates to the drawings, the same numerals in different drawings denote the same or similar elements unless otherwise indicated. The embodiments described in the following some embodiments are not representative of all embodiments consistent with the disclosure. Rather, they are only examples of apparatus and methods consistent with some aspects of the disclosure.

Terms used in the disclosure are merely for describing specific examples and are not intended to limit the disclosure. The singular forms "one", "the", and "this" used in the disclosure are also intended to include a multiple form, unless other meanings are clearly represented in the context. It should also be understood that the term "and/or" used in the disclosure refers to any or all of possible combinations including one or more associated listed items.

Reference throughout this specification to "one embodiment," "an embodiment," "an example," "some embodiments," "some examples," or similar language means that a certain feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the disclosure to describe various information, the information is not limited to the terms. These terms are merely used to differentiate information of a same type. For example, without departing from the scope of the disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a certain function.

Hitchcock zoom, also known as moving zoom or sliding zoom, is an advanced photographing technique in the field of video photographing. It mainly changes the focal length while pushing and pulling the camera position, so that the visual effect that the subject is roughly unchanged but the background space is compressed or enlarged appears in the photographed video, thus creating anxiety, panic and other emotions for the viewers. This kind of video effect produced by Hitchcock zoom is called Hitchcock effect.

Since this video special effect first appeared in the movie Vertigo filmed by suspense master Hitchcock in 1958, it was named Hitchcock Special Effect, and the corresponding photographing technique was called Hitchcock Zoom.

In the actual use of Hitchcock zoom, if the camera position is constantly close to the subject, the cameraman needs to reduce the focal length of the camera at a certain rate according to the motion speed of the camera position; when the camera position is constantly away from the subject, the photographer needs to increase the focal length of the camera at a certain rate according to the motion speed of the camera position.

Its theoretical basis is as follows: if an object height of the subject is h, in an initial state, an object distance is $u_1$, an image distance is $v_1$, a camera focal length is $f_1$, and an image height of the subject image is $h'_1$. According to the imaging formula, it can be obtained:

$$\frac{1}{u_1} + \frac{1}{v_1} = \frac{1}{f_1} \quad (1)$$

Through formula conversion, it can be obtained:

$$v_1 = \frac{u_1 f_1}{u_1 - f_1} \quad (2)$$

At this time, a magnification $M_1$ of imaging is:

$$M_1 = \frac{v_1}{u_1} = \frac{f_1}{u_1 - f_1} \quad (3)$$

And because magnification can also be expressed as a ratio of image height to object height, that is, $$M_1 = \frac{h'_1}{h} \quad (4)$$

Then from formulae (3) and (4), it can be obtained:

$$h'_1 = \frac{h f_1}{u_1 - f_1}$$

Because the object distance is much larger than the focal length of the camera, it can be approximated as:

$$h'_1 = \frac{h f_1}{u_1} \quad (5)$$

When the cameraman changes the focal length of the camera from $f_1$ to $f_2$, and the cameraman and the camera move back and forth on a slide rail, the object distance of the subject changes from $u_1$ to $u_2$, and the image height of the subject image changes from $h'_1$ to $h'_2$. Similar to formula (5), it can be obtained:

$$h'_2 = \frac{h f_2}{u_2} \quad (6)$$

Then the change of image height caused by the change of camera focal length, that is, a change of image size of the subject is $$\Delta h = h'_2 - h'_1 = h\left(\frac{f_2}{u_2} - \frac{f_1}{u_1}\right) \quad (7)$$

Hitchcock camera effect is characterized by keeping the image size of the subject unchanged, even if the $\Delta h$ in formula (7) is equal to 0. Thus, the following relationship can be obtained:

$$\frac{u_1}{u_2} = \frac{f_1}{f_2} \quad (8)$$

That is, a focal length ratio before and after the change is proportional to the object distance ratio. In other words, in the actual use of Hitchcock zoom, if the object distance is increased, the focal length of the camera needs to be increased.

Next, with reference to FIG. 1, the theoretical basis for the change of the image size of the background in the picture will be further introduced under the condition that the image size of the subject is kept unchanged. From the above introduction, it can be seen that the image size of the subject can be kept unchanged only if the change ratio of object distance is directly proportional to the change ratio of focal length.

As shown in FIG. 1, there are two object points in the scene, S is an object point on the subject, and B is an object point on the background. When the camera moves from a position P1 to a position P2, the object distance of the main object point S changes from SP1=$u_1$ to SP2=$u_2$, and the object distance of the background object point B changes from BP1=$w_1$ to BP2=$w_2$. An included angle SP1B=$\theta_1$, and an included angle SP2B=$\theta_2$. From a geometrical relationship, it can be obtained:

$$u_1 = w_1 \cos \theta_1 \quad (9)$$

$$u_2 = w_2 \cos \theta_2 \quad (10)$$

Combined with formula (8), formula (11) can be obtained:

$$\frac{u_1}{u_2} = \frac{f_1}{f_2} = \frac{w_1 \cos\theta_1}{w_2 \cos\theta_2} \quad (11)$$

Since $\theta_1 < \theta_2$, $$\frac{w_1}{w_2} \neq \frac{f_1}{f_2} \qquad (12)$$

The image height of the background object point is g, and the image height before and after the change is Δg'. Imitating the formula (7), the image height change formula (13) of the background object point can be obtained.

$$\Delta g' = g \left( \frac{f_2}{w_2} - \frac{f_1}{w_1} \right) \qquad (13)$$

Combined with formula (12), it can be seen that formula (13) is not equal to 0, that is, $$\Delta g' \neq 0 \qquad (14)$$

Therefore, it is proved that when the image height of the object point on the subject does not change, the image height of the object point in the background space must change.

However, it should be noted that the basis of the above demonstration process is that the subject must be located in the center of the picture, and a distance between the subject and the camera should not be too small, so as to avoid the object point on the subject deviating from the center of the picture too much.

As shown in formula (11), since the background object point B is not in the center of the picture, when the object distance of the camera changes, the viewing angle of the background object point B changes, so that the image height change caused by both the object distance change and the focal length change cannot cancel each other. For the subject, only a small number of object points are located in the center of the picture, and most of the subject object points also have a certain angle of view. But since the angle of view of this part of object points is relatively small, the change of angle of view brought by the change of object distance is not significant, which is approximately 0, so it is approximately considered that the change of image height is canceled out with each other.

As can be seen from the above introduction, when photographing video pictures with Hitchcock effect, the photographing method of the Hitchcock zoom must be strictly followed, and it is required that the object distance change between the camera position and the subject and the focal length change of the camera both maintain a stable change rate, and both change rates satisfy a certain mathematical relationship, even if the ratio of object distance before and after the change is always proportional to the ratio of focal length. Usually, professionals with advanced photography skills are required to achieve the above requirements, and a large number of photographing equipment is needed, so the cost of photographing is high.

In some embodiments, in a related technology, it is necessary to control the camera to approach the subject at a stable rate by means of a slide rail, and while moving position, the focal length of the camera is adjusted by manually controlling the focal length. In another related technology, the camera approaches the subject at a stable rate by a stable flight of an unmanned aerial vehicle, but the focal length change rate of the camera needs to be calculated and set in advance.

Therefore, the disclosure provides an image processing method to avoid the problems of high hardware cost and high technical requirements for photographers caused by the need for additional instruments when the related technology photographs video pictures with Hitchcock effect.

Figure 2:
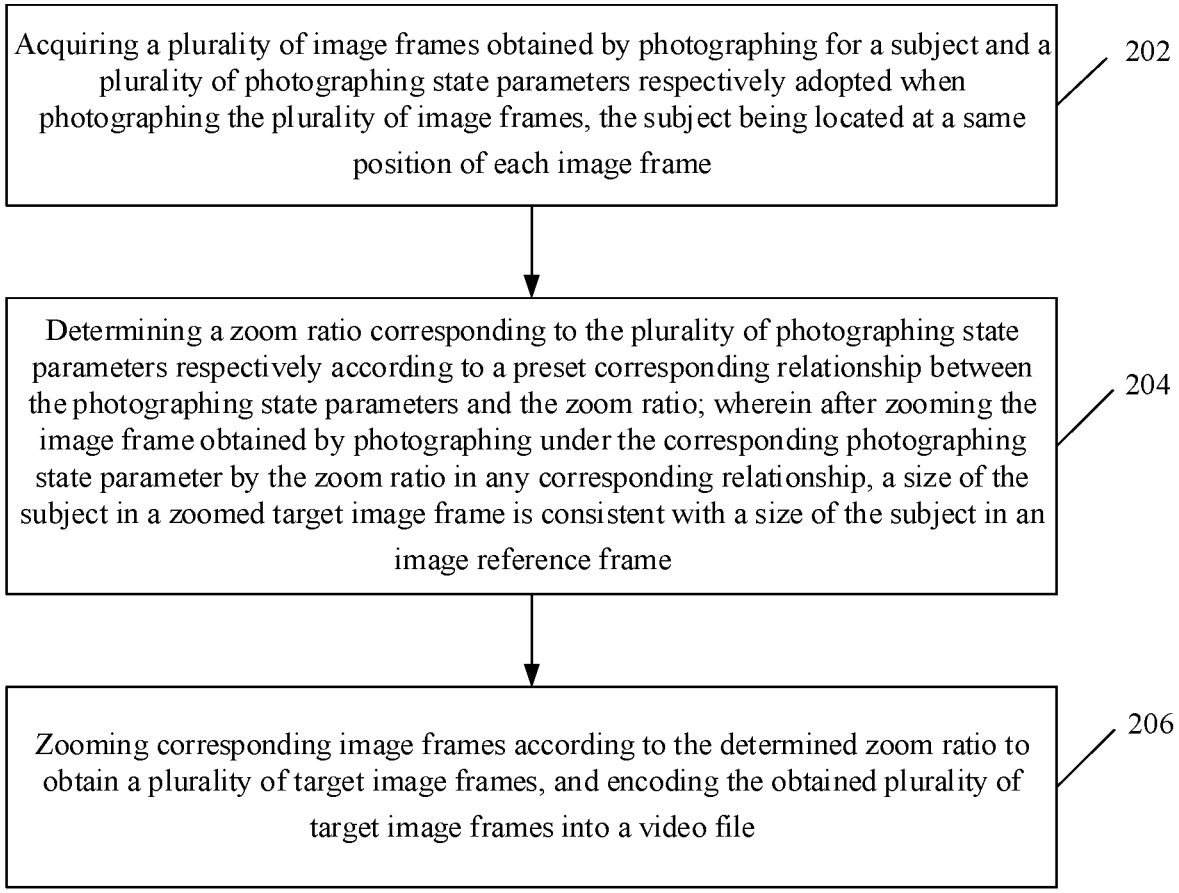
FIG. 2 is a flowchart of an image processing method shown in some embodiments of the disclosure.

FIG. 2 is a flowchart of an image processing method shown in some embodiments of the disclosure. As shown in FIG. 2, the method may include the following steps:

Step 202, acquiring a plurality of image frames obtained by photographing for a subject and a plurality of photographing state parameters respectively adopted when photographing the plurality of image frames, the subject being located at a same position of each image frame.

From the above introduction of Hitchcock zoom, it can be seen that when photographing video pictures with Hitchcock effect in related technologies, it is used that when the change of focal length and the change of object distance meet a certain mathematical relationship, the effects of the two on the imaging changes of the subject located in the center of the picture cancel each other. Based on this, the photographer can make the focal length change and object distance change in the photographing process satisfy the mathematical relationship as much as possible through instruments and/or techniques, so that the photographed video picture contains Hitchcock effect.

It is not difficult to understand that the related technology starts from the generation principle of Hitchcock effect, and obtains the video picture with Hitchcock effect by pure pre-photographing. Therefore, the related technologies have higher requirements for the professionalism of photographing instruments and photographers.

In view of this, the disclosure no longer relies on the canceling effect of focal length change and object distance change on imaging change, but proposes an image processing method combining pre-photographing and post-processing from the presentation effect of Hitchcock effect, so as to avoid the high requirements of Hitchcock zoom on photographing instruments and photographers.

Specifically, the presentation effect of Hitchcock effect is that the size of the subject remains unchanged, but the background space produces a visual effect of compression or enlargement. On this basis, the disclosure still obtains a video with compression phenomenon and/or enlargement phenomenon in the background space by means of pre-photographing, and makes the size of the subject in the plurality of image frames consistent by means of respectively zooming a plurality of image frames in the video.

It should be understood that since the technical solution of the disclosure no longer relies on the cancellation effect of object distance change and image distance change on imaging change, but the size of the subject in a plurality of image frames is kept consistent by zooming the image frames later. Therefore, through the technical solution of the disclosure, only the photographer needs to keep the subject at a fixed position of the picture (even if the subject is at the same position of each image frame) in pre-photographing, thus greatly reducing the operation requirement of the pre-photographing. It can be seen that the video with Hitchcock effect can be obtained by the technical solution of the disclosure without additional photographing instruments as in the related technology, and there is no higher technical threshold for photographers.

Step 204, determining a zoom ratio corresponding to the plurality of photographing state parameters respectively according to a preset corresponding relationship between the photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame.

It should be understood that the technical solution of the disclosure is equivalent to obtaining a changed background space by means of pre-photographing, and then canceling the size change of the subject in the pre-photographing process by means of post-zooming. Therefore, in order to change the background space during the pre-photographing process, the photographer can continuously adjust at least one photographing state parameter during the pre-photographing process. The direction and rate of change of the photographing state parameters affect a direction and rate of change of the size of the subject in the picture. In some embodiments, as the electronic device continuously approaches the subject, the size of the subject in the picture will continuously increase, and the increasing rate is positively correlated with the rate at which the electronic device approaches the subject. In other words, there is a certain corresponding relationship between the photographing state parameters and the size of the subject in the picture, and accordingly, there must be a certain corresponding relationship between the zoom ratio set in order to cancel the size change of the subject latter and the photographing state parameters. Therefore, in the disclosure, a corresponding relationship between at least one set of photographing state parameters and the zoom ratio can be preset for determining the zoom ratio adopted for each image frame in post-processing.

In the disclosure, the photographer can obtain a plurality of image frames by adjusting different photographing state parameters in the pre-photographing process.

In some embodiments, the photographer can photograph a video by pushing and pulling (moving back and forth) the electronic device in the pre-photographing process to ensure that the subject is always at a fixed position of the picture. In this process, it is equivalent to changing the device motion parameters of electronic device, so that the background space in the photographed video picture is constantly changing. Accordingly, in some embodiments, a corresponding relationship between the device motion parameter and the zoom ratio should be preset. Then, in some embodiments, after obtaining a plurality of image frames in the video obtained by photographing, and device motion parameters respectively adopted when photographing a plurality of image frames, according to the preset corresponding relationship, the zoom ratio corresponding to each device motion parameters is determined, and then the corresponding image frame is zoomed by the determined zoom ratio, so that the size of the subject in the zoomed target image frame is consistent with the size of the subject in the image reference frame.

It should be understood that for photographers, they can know the influence of pushing and pulling back or moving electronic devices on video pictures without mastering professional camera knowledge. In some embodiments, the photographer can determine that the background space in the video picture will be continuously enlarged when the electronic device is close to the subject, and the background space in the video picture will be continuously compressed when the electronic device is away from the subject according to the law of enlargement and reduction of the object observed by the eye when the photographer is close to or far away from the object. It can be seen that through the technical solution of the embodiment, the user can accurately determine the photographing mode of the required video special effects (mainly referring to the moving direction during photographing) only by mastering the relationship between the moving direction and the imaging change (obviously common sense of life), thus avoiding the situation that rephotographing is needed due to the wrong photographing mode. In some embodiments, when the background space in the video picture needs to be continuously enlarged, photographing can be carried out by continuously approaching the subject; when it is necessary to continuously compress the background space in the video picture, photographing can be carried out by continuously moving away from the subject.

In some embodiments, device motion parameters that are used separately when photographing a plurality of image frames can be obtained in a variety of ways.

In one case, motion information of the electronic device when photographing a plurality of image frames can be detected by a motion sensor equipped with the electronic device, such as a gyroscope, a magnetic sensor, etc., and data analysis is carried out on the acquired motion information to determine device motion parameters respectively adopted when photographing a plurality of image frames. In this case, there is a certain hardware requirement for electronic device, but it can simply and directly detect the device motion information used when photographing a plurality of image frames, and the efficiency is high.

In another case, the electronic device can acquire a proportion of the subject in each image frame, to compare a proportion of the subject in any image frame with a proportion of the subject in an adjacent frame of any image frame when determining the device motion parameters adopted for photographing the any image frame, and determine the device motion parameters adopted in photographing the any image frame according to change information of the proportion of the subject. In some embodiments, after a plurality of image frames are photographed, the proportion of the subject in each image frame may be compared with a proportion of the subject in a previous image frame (the previous image frame in the photographing time order) to determine device motion parameters of each image frame according to the change information of the proportion.

Certainly, the above examples are only schematic, and how to determine the device motion parameters corresponding to each image frame can be determined by those skilled in the art according to the actual needs, which is not limited by the disclosure.

In some embodiments, the photographer can keep the electronic device still during the pre-photographing process, and acquire the video picture with constantly changing background space by adjusting the focal length parameter of the camera. In this process, since the electronic device kept still, it is possible to ensure that the subject in the photographed video is always located at a fixed position of the picture. In this embodiment, the background space in the video picture is constantly changed by changing the focal length. Thus, in some embodiments, a corresponding relationship between the camera focal length parameter and the zoom ratio should be preset. Then, after obtaining a plurality of image frames in the video obtained by photographing, and a plurality of camera focal length parameters respectively adopted when photographing a plurality of image frames, according to the preset corresponding relationship, the zoom ratio corresponding to each of the plurality of camera focal length parameters is determined, and then the corresponding image frame is zoomed by the determined zoom ratio, so that the size of the subject in the zoomed target image frame is consistent with the size of the subject in the image reference frame.

In some embodiments, although it is necessary to master certain photography knowledge, that is, the relationship between focal length change and imaging change, the photographer can accurately determine the required video special effects and the adopted photographing mode (mainly referring to the direction of focal length adjustment during photographing: increasing or decreasing). However, the photography knowledge is entry-level knowledge, which is easy to master. In actual photographing, users do not need to move back and forth or push and pull, and only need to keep the electronic device still to photograph video pictures with Hitchcock effect, which further simplifies the operation of obtaining Hitchcock effect.

It is not difficult to understand that, the above two embodiments respectively perform pre-photographing by changing the focal length and object distance, and cancel the size change brought by the change of focal length or object distance to the subject by zooming the image frame later, so that Hitchcock effect in which the size of the subject remains unchanged and the background space is compressed or enlarged can be realized.

In the disclosure, an image reference frame needs to be determined in advance, so that the image reference frame is used as a standard for enlargement and reduction of each image frame. Specifically, after each image frame is zoomed by the corresponding zoom ratio, the size of the subject in the image frame is consistent with the size in the image reference frame.

In actual operation, different image frames can be determined as the image reference frames according to actual requirements.

In some embodiments, the acquired a plurality of image frames have a unified image reference frame. In some embodiments, an image frame may be selected from a plurality of photographed image frames as an image reference frame. In some embodiments, the first photographed image frame or the last photographed image frame of the acquired plurality of image frames may be used as the image reference frame, which is equivalent to the first frame or the last frame of the photographed video as the image reference frame.

In some embodiments, the acquired a plurality of image frames have respective corresponding image reference frames. In some embodiments, each image frame may have its own adjacent frame as its own image reference frame. In one case, each image frame in the plurality of image frames may use a previous frame in the preset arrangement order as its own image reference frame, or each image frame in a plurality of image frames may use a next image frame in the preset arrangement order as its own image reference frame. In this case, since each image frame takes adjacent frames in the same direction of the preset arrangement order as its own image reference frame, that is, after each image frame is zoomed, the size of the subject is consistent with that of the adjacent frames in the same direction, so that the size of the subject in each image frame must be consistent. In an actual operation, the present arrangement order mostly adopts the photographing time order of a plurality of image frames, and the specific order as the present arrangement order can be determined by those skilled in the art according to the actual situation, which is not limited by the disclosure. It should be emphasized that for the first image frame in the preset arrangement order, there is no previous image frame. Therefore, if the previous image frame is used as the image reference frame, the first image frame can default to its own image reference frame; the same is true for the last image frame in the preset arrangement order, so it will not be repeated here.

Certainly, the above examples are only schematic, and the specific determination of the image reference frame can be determined by those skilled in the art according to the actual situation and the disclosure is not limited thereto.

The purpose of presetting the corresponding relationship between the photographing state parameter and the zoom ratio is to make the size of the subject in the image frame coincide with the size in the image reference frame after the image frame photographed under the corresponding photographing state parameter is zoomed by the corresponding zoom ratio. It is not difficult to understand that the corresponding relationship between the photographing state parameters and the zoom ratio is set with reference to the selected image reference frame. It can be seen that the setting of the corresponding relationship must be related to the selection mode of the image reference frame.

In some embodiments, in the embodiments where the photographing state parameter is a device motion parameter, the device motion parameter may be a motion speed, a motion distance, or other motion parameters of the device. The motion parameter of the device specifically being which motion parameter of the device is typically associated with the selected reference frame. Under normal circumstances, when the acquired a plurality of image frames have a unified image reference frame, the device motion parameters are usually "the device position when photographing each image frame, and the motion distance of the device position when photographing the image reference frame", accordingly, the corresponding relationship between "the device motion distance and the zoom ratio" is preset; when a plurality of image frames have respective corresponding image reference frames, in some embodiments, when the reference frame corresponding to each image frame is the previous image frame of the corresponding image frame, the device motion parameter is usually "the device motion speed when photographing the image frame", accordingly the corresponding relationship between "the device motion speed and the zoom ratio" is preset. Certainly, the photographing state parameters used in each of the image frame selection modes are only schematic. For instance, in various image frame selection modes, the adopted photographing state parameters and the set corresponding relationships can be set by those skilled in the art according to the actual situation, and the disclosure is not limited thereto.

In some embodiments, in the embodiments where the photographing state parameter is the focal length parameter of the camera, the focal length parameter of the camera may be the focal length change speed of the camera, the focal length value of the camera, or other parameters of the device related to the focal length of the camera. Which parameter specifically being the focal length parameter is typically associated with the selected reference frame. Usually, when the acquired a plurality of image frames have a unified image reference frame, the camera focal length parameter is usually "the focal length difference between the camera focal length value when photographing each image frame and the camera focal length value when photographing the image reference frame", accordingly, the corresponding relationship between "the camera focal length difference and the zoom ratio" is preset; and when a plurality of image frames have respective corresponding image reference frames, in some embodiments, when the reference frame corresponding to each image frame is the previous image frame of the corresponding image frame, the focal length parameter of the camera is usually "the focal length change speed when photographing the image frame", accordingly, the corresponding relationship between "the focal length change speed and the zoom ratio" is preset. Certainly, the photographing state parameters used in each of the image frame selection modes are only schematic. For instance, in various image frame selection modes, the adopted photographing state parameters and the set corresponding relationships can be set by those skilled in the art according to the actual situation, and the disclosure is not limited to this.

Step 206, zooming corresponding image frames according to the determined zoom ratio to obtain a plurality of target image frames, and encoding the obtained plurality of target image frames into a video file.

After obtaining a plurality of target image frames, the disclosure can encode the plurality of target image frames into a video file in a variety of ways.

In some embodiments, the disclosure may determine a time order in which a plurality of image frames are paragraphed and encode the resulting plurality of target image frames into a video file in accordance with the time order.

For example, assuming that four image frames A, B, C and D are photographed, and the time order of photographing these four image frames is "A→B→C→D". After the four image frames are zoomed, the resulting four target image frames are a, b, c and d. Then, the four target image frames can be encoded into a video file in an order of "a→b→c→d".

In some embodiments, the disclosure may determine respective zoom ratios for the acquired a plurality of target image frames, and sort the plurality of target image frames according to a predefined zoom ratio sorting rule. On this basis, the plurality of target image frames can be encoded into a video file according to a sorting result.

For example, assuming that the zoom ratio sorting rule is that the target image frames are sorted in an order of increasing the zoom ratio, and assuming that the zoom ratios corresponding to the four target image frames A, B, C and D are 0.9, 0.8, 0.7 and 0.6 respectively, the order of the plurality of target image frames after sorting is: target image frames D, C, B and A. On this basis, the plurality of target image frames can be encoded into a video file in the order of "D→C→B→A".

In practice, the above zoom ratio sorting rule can be set according to actual needs. In some embodiments, if it is necessary to realize the visual effect of constantly enlarging the background space, a plurality of target image frames can be sorted in a manner of sequentially increasing the zoom ratio as above. The specific zoom ratio sorting rule can be determined by those skilled in the art according to the actual needs. In some embodiments, the sorting method of first increasing and then decreasing can also be adopted to produce the visual effect of first enlarging and then compressing the background space, thereby creating a tense and depressing atmosphere for the viewer, which is not limited by the disclosure.

It should be noted that since the disclosure obtains the target image frame by zooming the image frame, the sizes of the zoomed target image frames are actually different. Therefore, before encoding the target image frames into a video file, the target image frames can also be cropped so that the sizes of the cropped target image frames are consistent.

In addition, since the disclosure is not the related art, it uses the cancellation effect of object distance change and focal length change on imaging change (the subject must be in the center of the picture before the cancellation effect can be used to keep the size of the subject unchanged) to obtain Hitchcock effect. Therefore, when the Hitchcock effect is realized by using the technical solution of the disclosure, the subject is not necessarily located in the center of the picture, but only needs to be located at the same position of the obtained a plurality of image frames. The same position can be the center position of the corresponding image frame as in the related technology, so the Hitchcock effect consistent with the related technology can be obtained (the subject is located in the center of the picture and the size is unchanged; compression or enlargement occurs in the background space). The same position may also be different from that in the related art, and may be any location in the corresponding image frame that is off-center or, in some embodiments, to the left in the corresponding image frame, so that a Hitchcock effect different from that in the related art can be obtained (the size of the subject is unchanged, but it is not located in the center of the picture; and compression or enlargement occurs in the background space).

It should be emphasized that the technical solution of the disclosure can be applied to any type of electronic device, as long as the electronic device is equipped with a camera and has an image acquisition function. In some embodiments, the electronic device may be a mobile terminal such as a smart phone or tablet computer, or a fixed terminal such as a smart TV or a PC (Personal Computer) with a camera installed. The specific type of electronic device as the executive body of the technical solution of the disclosure can be determined by those skilled in the art according to the actual requirements, and the disclosure is not limited to this.

It can be seen from the above technical solution, in the disclosure, after obtaining a plurality of image frames, and photographing state parameters respectively adopted when photographing a plurality of image frames, the zoom ratio corresponding to the plurality of photographing state parameters can be respectively determined according to the corresponding relationship between the preset photographing state parameters and a zoom ratio, and then the corresponding image frames are zoomed through the determined zoom ratio to obtain a plurality of target image frames. After zooming the image frame obtained by photographing under the corresponding photographing state parameter by the zoom ratio in any corresponding relationship, a size of the subject in the zoomed target image frame is consistent with a size of the subject in an image reference frame.

It should be understood that after the acquired plurality of image frames are zoomed by corresponding zoom ratios, the size of the subject in the obtained plurality of target image frames is consistent with the size of the subject in the image reference frame, which is equivalent to the size of the subject in the plurality of target image frames. Therefore, after a plurality of target image frames are encoded into a video file, the size of the subject in the video picture remains unchanged.

In practice, a photographer can change the background space by changing the photographing state parameters, and then cancel a size change of the subject in a previous photographing process by zooming the image frame, resulting in a Hitchcock special effect where the subject remains the same and the background space changes in the final processed video.

Compared with related technologies, the way to realize the Hitchcock effect through Hitchcock zoom photographing technique, the technical solution of the disclosure no longer depends on the cancellation effect of focal length change and object distance change on imaging change, but starts from the presentation effect of Hitchcock effect, obtains a plurality of image frames with constantly changing background space through pre-photographing, and cancels the size change of the subject in the pre-photographing process through a post-zooming mode. Therefore, the technical solution of the disclosure has extremely low requirements on pre-photographing skills and photographing instruments, and avoids the problem of high cost caused by the need of additional photographing instruments in related technologies and the problem of high technical threshold for photographers.

In addition, in related technology, since the change amplitude of imaging is related to the distance between imaging and the center of the picture (that is, the cancellation phenomenon of imaging change due to the change of focal length and object distance only occurs in the center area of the picture), in the process of Hitchcock zoom, the subject must be kept in the center of the picture, and in the video picture with Hitchcock effect obtained in this way, the subject must also be located in the center of the picture. However, according to the technical solution of the disclosure, since the cancellation effect of image distance change and object distance change on imaging change is no longer relied on, the subject is no longer required to be located in the center of the picture during the pre-photographing process. In other words, with the technical solution of the disclosure, in addition to the conventional Hitchcock effect in which the size of the subject in the center of the picture is kept unchanged, the Hitchcock effect in which the subject is not located in the center of the picture can also be obtained, and in some embodiments, the subject can be located in the left half or the right half of the picture, etc.

Hereinafter, the technical solution of the disclosure will be introduced by way of specific embodiments taking a smart phone (hereinafter referred to as a mobile phone) as an example.

Figure 3:
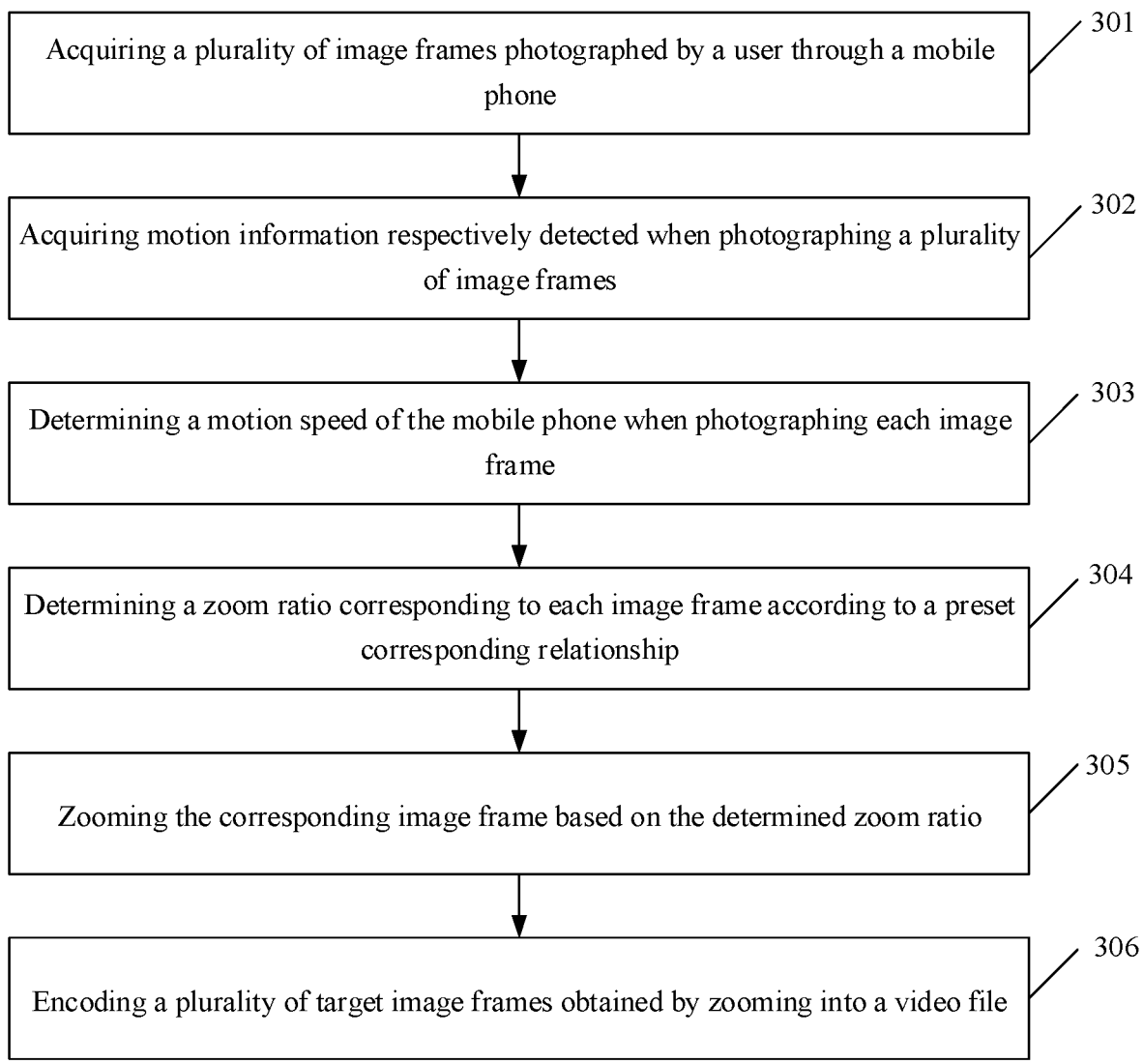
FIG. 3 is a flowchart of another image processing method shown in some embodiments of the disclosure.

FIG. 3 is a flowchart of an image processing method shown in some embodiments of the disclosure. As shown in FIG. 3, the method includes the following steps:

Step 301, acquiring a plurality of image frames photographed by a user through a mobile phone.

In some embodiments, the user can push and pull back and forth or walk back and forth to make the mobile phone keep the subject in a fixed position in a picture during an image photographing process. This photographing method is equivalent to a method of changing an object distance, so that the background in the photographed picture changes constantly.

In an actual operation, after the user opens the image photographing application installed in the mobile phone, the video special effects that can be realized can be displayed to the user. When the user selects the Hitchcock effect, the prompt information of "Please keep the subject in a fixed position of the picture during video photographing" can be further displayed in the photographing interface to remind the user to keep the position of the subject in the picture unchanged.

Step 302, acquiring motion information detected by a gyroscope when photographing a plurality of image frames.

In some embodiments, the motion information when photographing a plurality of image frames can be detected by using the gyroscope previously assembled in the mobile phone, so as to determine device motion parameters respectively used when photographing a plurality of images according to the obtained motion information.

Step 303, determining a motion speed of the mobile phone when photographing each image frame according to the acquired motion information.

In some embodiments, the corresponding relationship between the motion speed and the zoom ratio may be set in advance for ensuring that a size of the subject in each image frame is consistent by zooming the image frame after the image is obtained.

In an actual operation, the relationship between the motion speed and a zoom factor of the subject can be obtained through experiments by a technician, and the corresponding relationship between the motion speed and the zoom ratio can be determined according to the relationship.

For example, assuming that the experiment measured: when photographing an image frame, the mobile phone moves forward at a speed of 3 cm/s, and the size of the subject in the image frame is enlarged by 4/3 times compared with that in the previous image frame, thus the zoom ratio can be set to 3/4 in order to keep the size of the subject consistent with that in the previous image frame after zooming the image frame.

In this example, the previous image frame of each image frame obtained by photographing is used as a respective image reference frame, and the motion speed of the mobile phone is used as a device motion parameter. Since the size of the subject in each frame image after zooming is consistent with the size of the subject in the previous frame image, it is possible to ensure that the size of the subject is consistent in a plurality of target image frames after zooming.

Step 304, determining a zoom ratio corresponding to each image frame according to the preset corresponding relationship between the motion speed and the zoom ratio.

Following the above example, assuming that the relationship between the motion speed and the zoom ratio set in advance by the technician is shown in Table 1 below:

TABLE 1

| Motion speed (cm/s) | Zoom ratio |
|---|---|
| . . . | . . . |
| −3 | 4/3 |
| −2 | 5/4 |
| −1 | 6/5 |
| 0 | 1 |
| +1 | 5/6 |
| +2 | 4/5 |
| +3 | 3/4 |
| . . . | . . . |

In the above table, the motion speed is positive, that is, the motion direction is a direction "close to the subject"; if the motion speed is negative, it means that the motion direction is a direction "away from the subject".

Step 305, zooming the corresponding image frame based on the determined zoom ratio.

Following the above example, assuming that four image frames A, B, C and D are photographed, and when it is determined that these four image frames are photographed, the motion speed of the device is shown in the following Table 2:

TABLE 2

| Image frame | Motion speed (cm/s) |
|---|---|
| A | 0 |
| B | +1 |

TABLE 2-continued

| Image frame | Motion speed (cm/s) |
|---|---|
| C | +2 |
| D | +3 |

On this basis, Table 2 can be compared with table 1, and then the zoom ratio corresponding to image frame A is determined to be 1; the zoom ratio corresponding to image frame B is 5/6; the zoom ratio corresponding to image frame C is 4/5; and the zoom ratio corresponding to image frame D is 3/4. In other words, the following Table 3 can be further obtained on the basis of Table 2:

TABLE 3

| Image frame | Motion speed (cm/s) | Zoom ratio |
|---|---|---|
| A | 0 | 1 |
| B | +1 | 5/6 |
| C | +2 | 4/5 |
| D | +3 | 3/4 |

After obtaining the corresponding zoom ratios of a plurality of image frames, the image frames can be zoomed respectively. Specifically, since the zoom ratio of the image frame A is 1, the image frame A is not zoomed, and the image frame A is directly used as a target image frame A'; the image frame B is zoomed to 5/6 of the original to obtain a target image frame B'; the image frame C is zoomed to 4/5 of the original to obtain a target image frame C'; the image frame D is zoomed to 3/4 of the original to obtain a target image frame D'.

Step 306, encoding a plurality of target image frames obtained by zooming into a video file according to a photographing order.

In some embodiments, a plurality of target image frames may be encoded into a video file directly in the order in which the image frames are photographed.

Following the above example, since the time order of photographing a plurality of image frames is "A→B→C→D", the target image frames A', B', C', D' can be encoded into a video file in the order of "A'→B'→C'→D'".

It should be stated that the above example is only schematic, and the technical solution of the disclosure is introduced only by taking the photographing state parameter as the motion speed and the image reference frame of each image frame as the previous image frame of the respective image frame as an example. In practical application, it can be implemented in any way introduced above, and examples will not be repeated here.

According to the above technical solution, through the technical solution of the embodiment, the user only needs to push, pull or move back and forth to ensure that the subject in a plurality of image frames obtained by photographing is located at a fixed position, so that the Hitchcock effect can be realized. Users do not need to strictly control the motion speed or adjust the focal length of the camera while moving, which greatly simplifies the operation of realizing Hitchcock effect and lowers the technical threshold of realizing Hitchcock effect.

It should be understood that for users, they can know the influence of pushing and pulling back or moving the mobile phone on video pictures without mastering professional camera knowledge. In some embodiments, the photographer can determine that the background space in the video picture will be continuously enlarged when the mobile phone is close to the subject, and the background space in the video picture will be continuously compressed when the mobile phone is away from the subject according to the law of enlargement and reduction of the object observed by the eye when the photographer is close to or far away from the object. It can be seen that through the technical solution of the embodiment, the user can accurately determine the photographing mode of the required video special effects only by mastering the relationship between the moving direction and the imaging change (obviously common sense of life), thus avoiding the situation that rephotographing is needed due to the wrong photographing mode. In some embodiments, when the background space in the video picture needs to be continuously enlarged, photographing can be carried out by continuously approaching the subject; when it is necessary to continuously compress the background space in the video picture, photographing can be carried out by continuously moving away from the subject.

Figure 4:
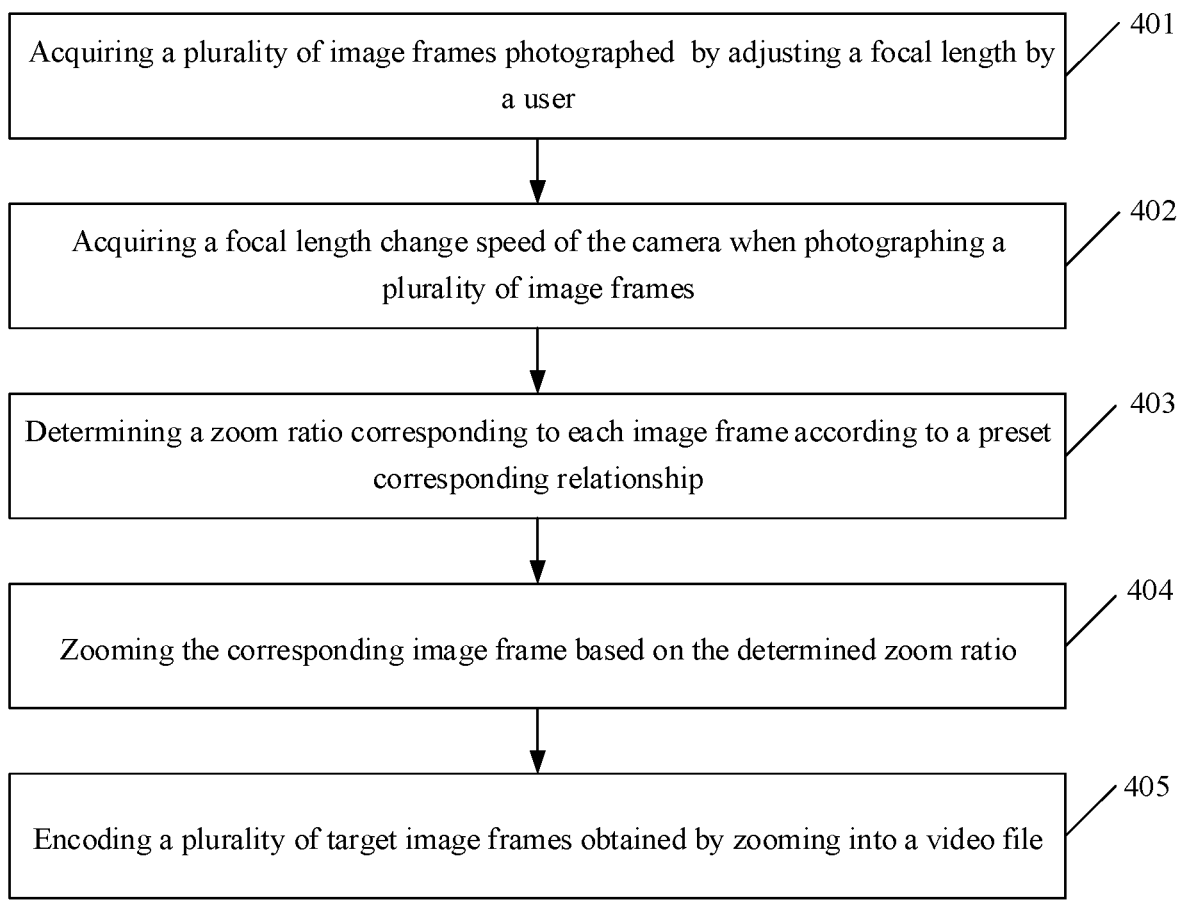
FIG. 4 is a flowchart of yet another image processing method shown in some embodiments of the disclosure.

FIG. 4 is a flowchart of an image processing method shown in some embodiments of the disclosure. As shown in FIG. 4, the method includes the following steps:

Step 401, acquiring a plurality of image frames photographed by a user by adjusting a focal length of a camera.

In some embodiments, the user can keep the mobile phone still, and adjust the focal length of the camera to make the mobile phone always keep the subject in a fixed position in a picture during an image photographing process. This photographing method is equivalent to a method of changing a focal distance, so that the background in the photographed picture changes constantly.

In an actual operation, after the user opens the image photographing application installed in the mobile phone, the video special effects that can be realized can be displayed to the user. When the user selects the Hitchcock effect, the operation control for adjusting the focal length of the camera can be further displayed in the photographing interface, and the prompt information "Please keep the mobile phone still as much as possible and photograph by adjusting the focal length of the camera" can be further displayed.

In step 402, acquiring a focal length change speed of the camera when photographing a plurality of image frames.

In some embodiments, the mobile phone can monitor the focal length change speed of the camera in real time to acquire the focal length change speed corresponding to the camera when photographing a plurality of image frames.

Step 403, determining a zoom ratio corresponding to each image frame according to the preset corresponding relationship between the focal length change speed and the zoom ratio.

In some embodiments, the corresponding relationship between the focal length change speed and the zoom ratio may be set in advance for ensuring that a size of the subject in each image frame is consistent by zooming the image frame after the image is obtained.

In an actual operation, the relationship between the focal length change speed and a zoom factor of the subject can be obtained through experiments by a technician, and the corresponding relationship between the focal length change speed and the zoom ratio can be determined according to the relationship.

For example, assuming that the experiment measured: when photographing an image frame, the focal length of the camera increases at a speed of 3 mm/s, and the size of the subject in the image frame is enlarged by 1.5 times compared with that in the previous image frame, the zoom ratio can be set to 2/3 in order to keep the size of the subject consistent with that in the previous image frame after zooming the image frame.

The present embodiment is similar to the previous embodiment in that the previous image frame of each image frame obtained by photographing is used as the respective image reference frame, and the focal length change speed of the camera is used as the focal length parameter of the camera. Since the size of the subject in each frame image after zooming is consistent with the size of the subject in the previous frame image, it is possible to ensure that the size of the subject is consistent in a plurality of target image frames after zooming.

Assume that the relationship between the focal length change rate and the zoom ratio set in advance by the technician is shown in Table 4 below:

TABLE 4

| Focal length change speed (mm/s) | Zoom ratio |
|---|---|
| . . . | . . . |
| −3 | 3/2 |
| −2 | 4/3 |
| −1 | 5/4 |
| 0 | 1 |
| +1 | 4/5 |
| +2 | 3/4 |
| +3 | 2/3 |
| . . . | . . . |

In the above table, if the change speed of focal length is positive, it means that the focal length increases; and if the change speed of focal length is negative, it means that the focal length is reduced.

Step 404, zooming the corresponding image frame based on the determined zoom ratio.

Following the above example, assuming that four image frames E, F, G and H are photographed, and when it is determined that these four image frames are photographed, the focal length change speed of the device is shown in the following Table 5:

TABLE 5

| Image frame | Focal length change speed (mm/s) |
|---|---|
| E | 0 |
| F | +1 |
| G | +2 |
| H | +3 |

On this basis, Table 4 can be compared with table 5, and then the zoom ratio corresponding to image frame E is determined to be 1; the zoom ratio corresponding to image frame F is 4/5; the zoom ratio corresponding to image frame G is 3/4; and the zoom ratio corresponding to image frame H is 2/3. In other words, on the basis of Table 5, the following Table 6 can be further obtained:

TABLE 6

| Image frame | Focal length change speed (mm/s) | Zoom ratio |
|---|---|---|
| E | 0 | 1 |
| F | +1 | 4/5 |

TABLE 6-continued

| Image frame | Focal length change speed (mm/s) | Zoom ratio |
|---|---|---|
| G | +2 | 3/4 |
| H | +3 | 2/3 |

After obtaining the corresponding zoom ratios of a plurality of image frames, the image frames can be zoomed respectively. Specifically, since the zoom ratio of the image frame E is 1, the image frame E is not zoomed, and the image frame E is directly used as a target image frame E'; the image frame F is zoomed to 4/5 of the original to obtain a target image frame F'; the image frame G is zoomed to 3/4 of the original to obtain a target image frame G'; the image frame H is zoomed to 2/3 of the original to obtain a target image frame H'.

Step 405, encoding a plurality of target image frames obtained by zooming into a video file according to a photographing order.

In some embodiments, a plurality of target image frames may be encoded into a video file directly in the order in which the image frames are photographed.

Following the above example, since the time order of photographing a plurality of image frames is "E→F→G→H", the target image frames E', F', G', H' can be encoded into a video file in the order of "E'→F'→G'→H'".

It should be stated that the above example is only schematic, and the technical solution of the disclosure is introduced only by taking the photographing state parameter as the focal length change speed and the image reference frame of each image frame as the previous image frame of the respective image frame as an example. In practical application, it can be implemented in any way introduced above, and examples will not be repeated here.

It can be seen from the technical solution that through the technical solution of the disclosure, the user only needs to keep the mobile phone stationary and can realize the Hitchcock effect by changing the focal length of the camera. Compared with the previous embodiment, although it is necessary in the technical solution of this embodiment to master certain photography knowledge, that is, the relationship between focal length change and imaging change, the photographer can accurately determine the required video special effects and the adopted photographing mode (mainly referring to the direction of focal length adjustment during photographing: increasing or decreasing). However, the photography knowledge is entry-level knowledge, which is easy to master. In actual photographing, users do not need to move back and forth or push and pull, and only need to keep the electronic device still to photograph video pictures with Hitchcock effect, which further simplifies the operation of obtaining Hitchcock effect and reduces the energy consumed by the user to realize Hitchcock effect in the video picture.

Figure 5:
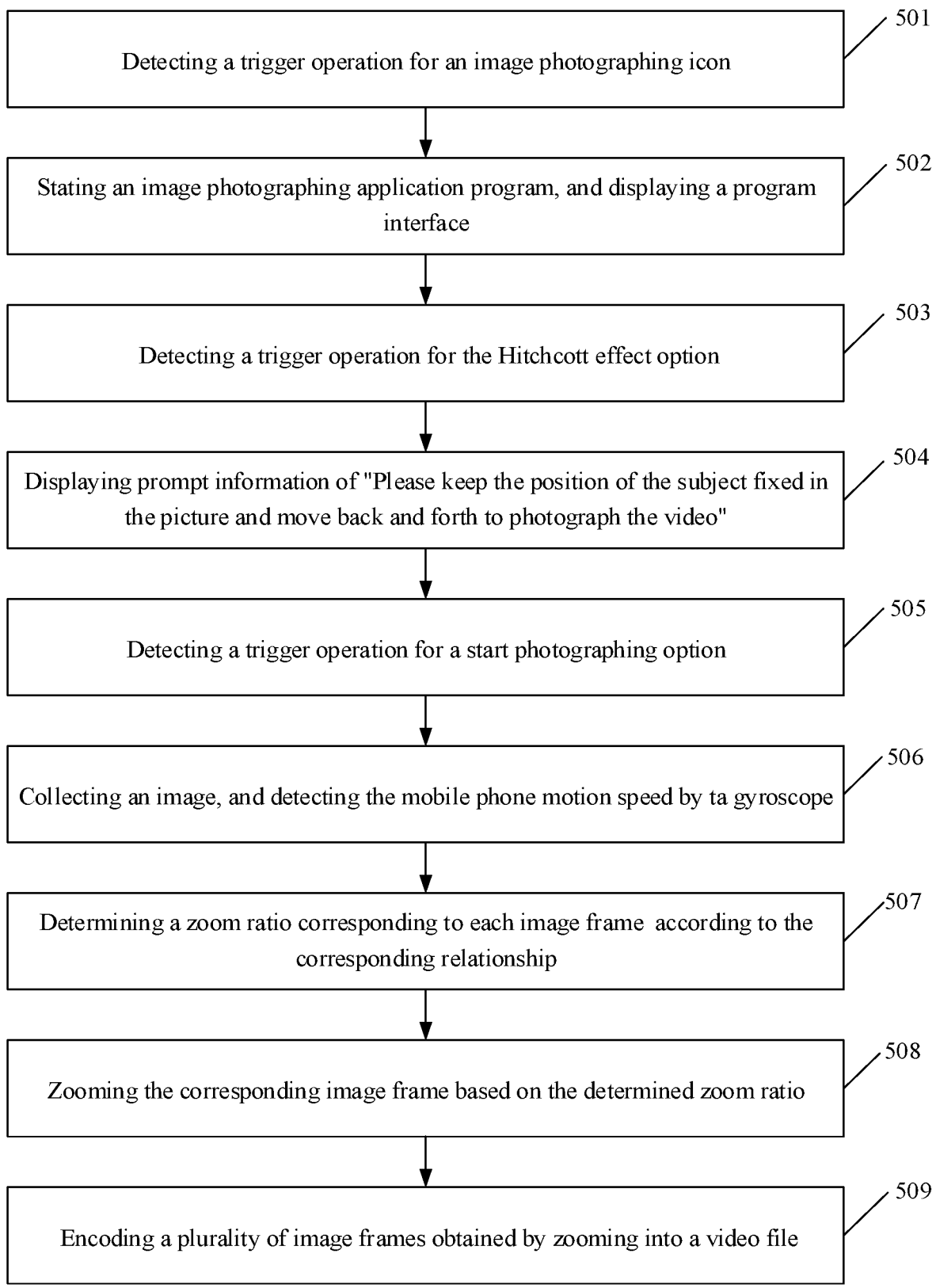
FIG. 5 is a flowchart of a Hitchcock effect implementation method shown in some embodiments of the disclosure.

FIG. 5 is a flowchart of a Hitchcock effect implementation method shown in some embodiments of the disclosure. As shown in FIG. 5, the method may include the following steps:

Step 501, detecting a trigger operation for the image photographing icon.

In some embodiments, an application with an image capture function may be pre-installed in the mobile phone. Then, when the user needs to photograph an image, the user only needs to trigger the corresponding image photographing icon (the icon corresponding to the application program with the image photographing function) to photograph the image.

Step 502, stating the image photographing application program, and displaying the corresponding program interface.

In some embodiments, a corresponding program interface may be displayed upon detection of a trigger operation by a user for an image capture icon. Two photographing options, "video" and "photo", can be displayed in this interface, so that the user can select the image form of this photographing.

After detecting that the user selects the "video" option, in the embodiment, various video special effect options can be displayed so that the user can select the video special effect needed to be added in the video picture obtained by this photographing. In some embodiments, a plurality of optional video special effect options such as fade-in, fade-out, from light to dark, from dark to light, Hitchcock effect and the like can be displayed.

Step 503, detecting a trigger operation for the Hitchcock effect option.

In some embodiments, a user may trigger the Hitchcock effect option to indicate that the Hitchcock effect is to be added to the video picture in this photographing.

After detecting the trigger operation of the user for the Hitchcock effect option, the mobile phone can adjust the video photographing mode to the photographing mode for realizing the Hitchcock effect. On this basis, once the mobile phone detects the trigger operation for a start photographing option, it can carry out corresponding post-processing on the photographed image frame to add Hitchcock effect to the photographed video picture.

Step 504, displaying prompt information of "Please keep the position of the subject fixed in the picture and move back and forth to photograph the video".

In some embodiments, the phone may further display photographing precautions after detecting a user's triggering action for the Hitchcock effect option.

In some embodiments, the Hitchcock effect is implemented in the manner shown in FIG. 3, so the user can be presented with prompt information of "please keep the position of the subject fixed in the picture and move the mobile phone back and forth to photograph the video".

Certainly, the present embodiment is only described with the example of "realizing the Hitchcock effect in the manner shown in FIG. 3". It should be understood that the actual display of prompt information should correspond to the implementation adopted. In some embodiments, when the Hitchcock effect is implemented in the manner shown in FIG. 4, the user may be presented with the prompt information "Please keep the mobile phone still and adjust the focal length to photograph the video".

Furthermore, the above two kinds of prompt information can be displayed at the same time. In some embodiments, the prompt information "Please keep the position of the subject fixed in the picture and move the mobile phone back and forth to photograph the video; or, keep the mobile phone still and adjust the focal length to photograph the video" may be displayed. On this basis, the mobile phone can automatically detect whether the user changes the motion state of the mobile phone or the focal length of the camera of the mobile phone after triggering the start photographing option, and then select the manner shown in FIG. 3 or FIG. 4 to realize Hitchcock effect according to the detected results.

Step 505, detecting a trigger operation for the start photographing option.

In some embodiments, since the manner shown in FIG. 3 is adopted, the motion speed of the mobile phone when each image frame in the photographed video can be monitored in real time for determining the zoom ratio corresponding to each image frame after the trigger operation of the user for the start photographing option is detected.

Step 506, calling the camera to collect images, and detecting the motion speed of the mobile phone when photographing each frame of images in real time by the gyroscope.

Step 507, determining the zoom ratio corresponding to each frame image according to the corresponding relationship between the motion speed and the zoom ratio.

Step 508, zooming the corresponding image frame based on the determined zoom ratio.

Step 509, encoding a plurality of image frames obtained by zooming into a video file.

In the above steps, how to determine the zoom ratio and how to encode a plurality of target image frames obtained by zooming into a video file can be described with reference to the embodiment shown in FIG. 3 and will not be described here.

It should be stated that in an actual operation, it is possible to either zoom the image in real time during the video photographing process or to perform a uniform zooming process after the whole video has been photographed. The specific operation may be determined by those skilled in the art according to actual needs and the disclosure is not limited thereto.

For example, in a case of "zooming the acquired image frames in real time during video photographing", every time the mobile phone photographs an image frame, the mobile phone motion speed detected by the gyroscope at this time can be obtained, and the zoom ratio corresponding to the image frame can be determined according to the preset corresponding relationship between the motion speed and the zoom ratio, so as to zoom the image frame.

In this case, the zoomed image frame can be directly displayed as a preview screen. It is conceivable that in the video photographing process, users can see the image changes through the preview screen with Hitchcock effect. In other words, videos with Hitchcock effect can be previewed in real time during photographing. In addition, in this case, when the video is photographed, the zooming process for a plurality of image frames is also finished, which improves the efficiency of post-processing and reduces the time required to obtain Hitchcock effect.

In the case of "unify zooming after the whole video is photographed", the mobile phone can perform a unified zooming process on the acquired a plurality of image frames after the user triggers the end photographing option (in actual operation, the end photographing option can be the start photographing option triggered again). In this case, the mobile phone does not need to carry out a complex post-processing in the photographing process, and has a lower requirement for the performance of the processor. In this case, more processing resources can be called for the zooming process, thus increasing the accuracy of post-processing.

In addition, although compared with the previous case, since there is no zooming process in the photographing process, it is slow to obtain the video with Hitchcock effect. However, for the same reason, the preview picture during photographing is the original picture obtained by actual photographing, which is convenient for users to compare the original picture with the video picture with Hitchcock effect obtained by post-processing.

According to the technical solution, the disclosure can add the Hitchcock effect option in the image photographing application program, so that when a user needs to photograph a video picture with the Hitchcock effect, the Hitchcock effect can be added to the photographed video picture through a simple selection operation.

After the user selects the Hitchcock effect option, the mobile phone can display the corresponding photographing precautions in the interface to prompt the user to photograph in a standardized way, thus avoiding the situation that Hitchcock effect cannot be added to the video picture due to the irregular photographing mode.

In addition, in this embodiment, the obtained image frame can be zoomed in real time during the video photographing process, so as to preview the imaging effect of the video picture with the Hitchcock effect in real time during the photographing process, and which improves the efficiency of adding the Hitchcock effect in the video picture. It is also possible to uniformly zoom a plurality of image frames after video photographing is finished, so as to reduce the processing requirements and improve the accuracy of post-processing.

Figure 6:
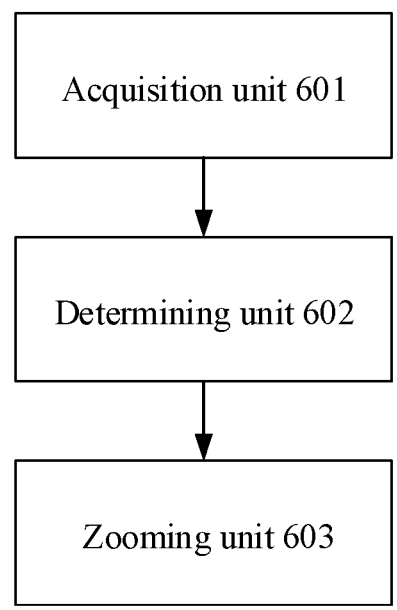
FIG. 6 is a block diagram of an image processing apparatus shown in some embodiments of the disclosure.

FIG. 6 is a block diagram of an image processing apparatus shown in some embodiments of the disclosure. Referring to FIG. 6, the apparatus includes an acquisition unit 601, a determination unit 602 and a zooming unit 603.

The acquisition unit 601 acquires a plurality of image frames obtained by photographing a subject and a plurality of photographing state parameters respectively adopted when photographing the plurality of image frames, the subject is located at the same position of each image frame; the determining unit 602 determines a zoom ratio corresponding to the plurality of photographing state parameters respectively according to a preset corresponding relationship between the photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and the zooming unit 603 zooms corresponding image frames according to the determined zoom ratio to obtain a plurality of target image frames, and encodes the obtained plurality of target image frames into a video file.

In some embodiments, the acquisition unit 601 is further used for: acquiring a plurality of image frames and device motion parameters respectively adopted when photographing the plurality of image frames; and the determining unit 602 is further used for respectively determining the zoom ratios corresponding to the respective device motion parameters according to the preset corresponding relationship between the device motion parameter and the zoom ratio.

In some embodiments, the acquisition unit 601 is further used for: acquiring motion information respectively detected by a motion sensor when photographing the plurality of image frames; and performing data analysis on the acquired motion information to determine device motion parameters respectively adopted when photographing the plurality of image frames.

In some embodiments, the acquisition unit 601 is further used for acquiring a first proportion of the subject in any image frame and a second proportion of the subject in adjacent image frames of any image frame; determining the device motion parameter adopted when photographing the any image frame according to change information of the first proportion and the second proportion.

In some embodiments, the acquisition unit 601 is further used for acquiring a plurality of image frames and focal length parameters respectively adopted when photographing the plurality of image frames; and the determining unit 602 is further used for determining the zoom ratios corresponding to the respective focal length parameters according to the preset corresponding relationship between the focal length parameter and the zoom ratio respectively.

In some embodiments, the image reference frame is any one of the plurality of image frames; alternatively, the image reference frame is the earliest or last photographed image frame among the plurality of image frames; alternatively, each of the plurality of image frames uses a previous image frame in the preset arrangement order as its own image reference frame, or each of the plurality of image frames uses a next image frame in the preset arrangement order as its own image reference frame.

In some embodiments, the zooming unit 603 is further used for determining a time order of photographing the plurality of image frames; and encoding the obtained plurality of target image frames into a video file according to the time order.

In some embodiments, the zooming unit 603 is further used for determining the zoom ratios adopted for the plurality of target image frames, and sorting the plurality of target image frames according to a predefined zoom ratio sorting rule; encoding the plurality of target image frames into a video file according to a sorting result.

In some embodiments, the same position of the respective image frames is a central position of the respective image frames.

For the apparatus embodiments, since it substantially corresponds to the method embodiments, it is sufficient to refer to the partial description of the method embodiment for the relevant parts. The apparatus embodiments described above are merely schematic, wherein the units illustrated as separate components may or may not be physically separated, and the components displayed as units may or may not be physical units, i.e., may be located in one place, or may be distributed over a plurality of network elements. Some or all of the modules can be selected according to actual needs to achieve the purpose of the solution of the disclosure. Those of ordinary skilled in the art will be able to understand and implement without creative effort.

Correspondingly, the disclosure also provides an image processing apparatus, which includes a processor; and a memory for storing processor executable instructions; wherein the processor is configured to implement the image processing method of any one of the above embodiments, for example, the method may include: acquiring a plurality of image frames obtained by photographing for a subject and a plurality of photographing state parameters respectively adopted when photographing the plurality of image frames, the subject being located at a same position of each image frame; determining a zoom ratio corresponding to the plurality of photographing state parameters respectively according to a preset corresponding relationship between the photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and zooming corresponding image frames according to the determined zoom ratio to obtain a plurality of target image frames, and encoding the obtained plurality of target image frames into a video file.

Correspondingly, the disclosure also provides an electronic device, which includes a memory; and one or more programs, wherein the one or more programs are stored in the memory, and configured to be executed by one or more processors contain instructions for implementing the image processing method in any one of the above embodiments, for example, the method may include: acquiring a plurality of image frames obtained by photographing for a subject and a plurality of photographing state parameters respectively adopted when photographing the plurality of image frames, the subject being located at a same position of each image frame; determining a zoom ratio corresponding to the plurality of photographing state parameters respectively according to a preset corresponding relationship between the photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and zooming corresponding image frames according to the determined zoom ratio to obtain a plurality of target image frames, and encoding the obtained plurality of target image frames into a video file.

Figure 7:
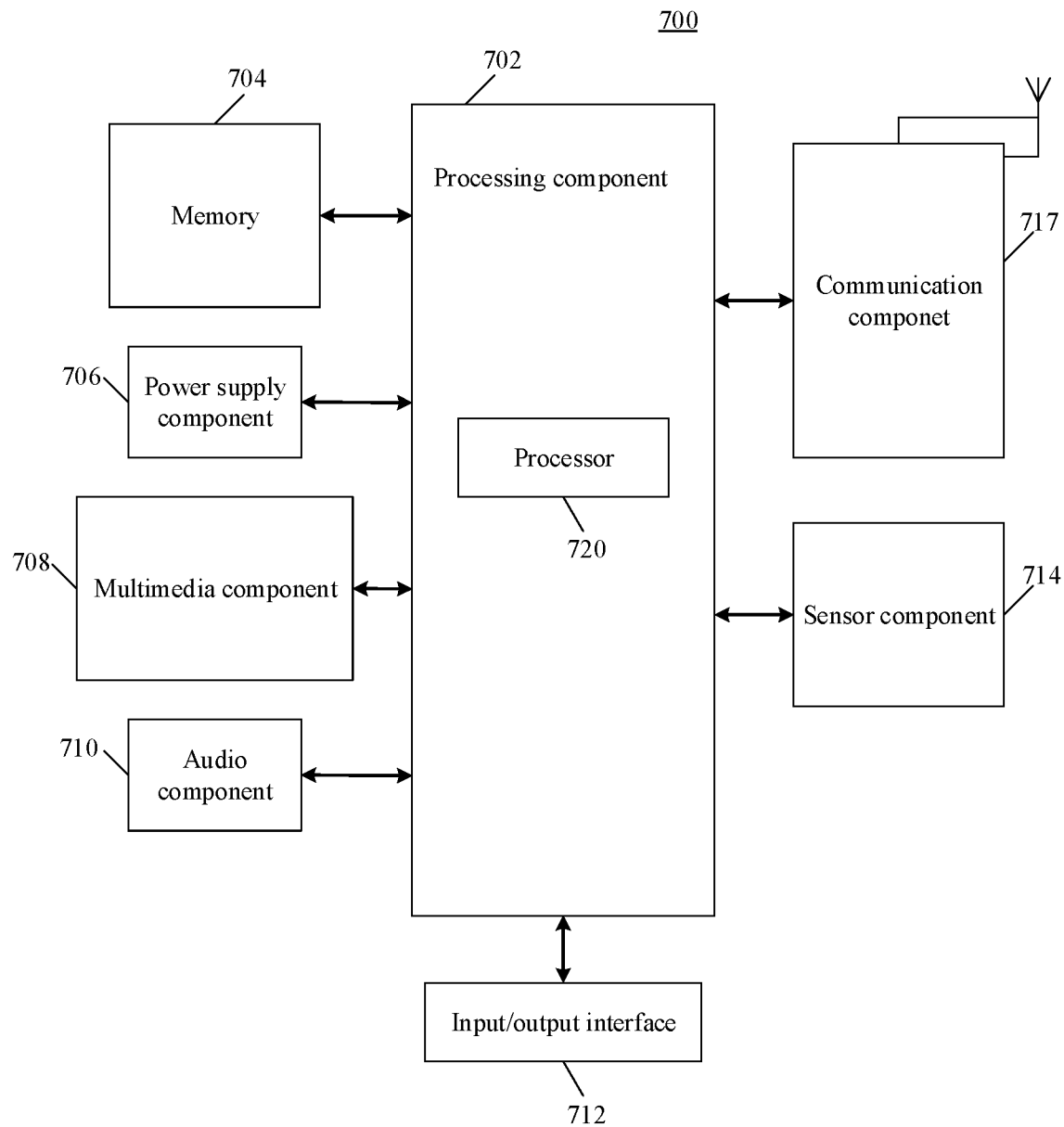
FIG. 7 is a block diagram of an image processing apparatus shown in some embodiments of the disclosure.

FIG. 7 is a block diagram of an image processing apparatus 700 shown according to some embodiments. In some embodiments, the apparatus 700 may be a mobile phone, a computer, a digital broadcasting terminal, a message transceiving device, a game console, a tablet device, a medical device, a fitness device, a personal digital assistant or the like.

Referring to FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 generally controls the overall operation of the apparatus 700 such as operations associated with display, telephone calls, data communication, camera operations and recording operations. The processing component 702 may include one or more processors 720 to execute instructions to complete all or part of the steps of the method described above. Further, the processing component 702 may include one or more modules to facilitate interaction between the processing component 702 and other components. In some embodiments, the processing component 702 may include a multimedia module to facilitate interaction between the multimedia component 708 and the processing component 702.

The memory 704 is configured to store various types of data to support operations of the apparatus 700. Examples of these data include instructions for any application or method operating on the device 700, contact data, phone book data, messages, pictures, videos and the like. The memory 704 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply module 706 provides power to various components of the apparatus 700. The power supply component 706 may include a power management system, one or more power sources and other components associated with generating, managing and distributing power for the apparatus 700.

The multimedia component 708 includes a screen that provides an output interface between the apparatus 700 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, slide, and gestures on the touch panel. The touch sensor may not only sense a boundary of a touch or slide action, but also detect a duration and pressure associated with the touch or slide operation. In some embodiments, the multimedia component 708 includes a front camera and/or a rear camera. When the apparatus 700 is in an operation mode, such as a photographing mode or a video mode, the front camera and/or the rear camera may receive external multimedia data. Each front camera and rear camera can be a fixed optical lens system or have focal length and optical zoom capability.

The audio component 710 is configured to output and/or input audio signals. In some embodiments, the audio component 710 includes a microphone (MIC) configured to receive an external audio signal when the apparatus 700 is in an operational mode, such as a call mode, a recording mode, and a speech recognition mode. The received audio signal may be further stored in memory 704 or transmitted via the communication component 716. In some embodiments, the audio component 710 also includes a speaker for outputting an audio signal.

The I/O Interface 712 provides an interface between the processing component 702 and peripheral interface modules, and the peripheral interface module may be keyboards, click wheels, buttons and the like. These buttons may include, but are not limited to, a home button, a volume button, a start button, and a lock button.

The sensor component 714 includes one or more sensors for providing a status evaluation of various aspects of the apparatus 700. In some embodiments, the sensor component 714 may detect an open/closed state of the apparatus 700, and relative positioning of components, in some embodiments, the component is a display and keypad of the apparatus 700, the sensor component 714 may also detect a change in position of the apparatus 700 or one component of the apparatus 700, a presence or absence of user contact with apparatus 700, an orientation or acceleration/deceleration of the apparatus 700, and temperature changes of the apparatus 700. The sensor component 714 may include a proximity sensor configured to detect the presence of a nearby object without any physical contact. The sensor component 714 may also include an optical sensor such as a CMOS or CCD image sensor for use in imaging applications. In some embodiments, the sensor component 714 may also include an acceleration sensor, a gyro sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard, such as WiFi, 2G or 3G, 4G LTE, 5G NR (New Radio), or a combination thereof. In some embodiments, the communication component 716 receives broadcast signals or broadcast-related information from an external broadcast management system via a broadcast channel. In some embodiments, the communication component 716 also includes a Near Field Communication (NFC) module to facilitate short range communication. In some embodiments, the NFC module may be implemented based on radio frequency identification (RFID) technology, infrared data association (IrDA) technology, ultra-wideband (UWB) technology, Bluetooth (BT) technology, and other technologies.

In some embodiments, the apparatus 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the methods described above.

In some embodiments, a non-transitory computer-readable storage medium including instructions is also provided, and in some embodiments, the memory 704 including instructions is provided, the instructions can be executed by the processor 720 of the apparatus 700 to accomplish the above methods. In some embodiments, the non-transitory computer-readable storage medium may be ROM, random access memory (RAM), CD-ROM, magnetic tape, floppy disk, optical data storage device, etc.

Other embodiments of the disclosure will readily occur to those skilled in the art after considering the description and practicing the disclosure disclosed herein. The disclosure is intended to encompass any variations, applications, or adaptations of the disclosure that follow the general principles of the disclosure and include common sense or conventional techniques in the art that are not disclosed in the disclosure. The description and embodiments are to be considered exemplary only and the true scope and spirit of the disclosure are indicated by the following claims.

It should be understood that the disclosure is not limited to the precise structure already described above and shown in the drawings and various modifications and changes may be made without departing from its scope. The scope of the disclosure is limited only by the appended claims.

The foregoing is not intended to limit the disclosure. Any modifications, equivalents, improvements, etc. made within the spirit and principles of the disclosure should be included within the scope of protection of the disclosure.

The invention claimed is:

1. An image processing method, comprising:
   acquiring a plurality of image frames obtained by photographing for a subject and a plurality of photographing state parameters respectively adopted when photographing the plurality of image frames, the subject being located at a same position of each image frame;
   determining a zoom ratio corresponding to the plurality of photographing state parameters respectively according to a preset corresponding relationship between the plurality of photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and
   zooming corresponding image frames according to the determined zoom ratio to obtain a plurality of target image frames, and encoding the obtained plurality of target image frames into a video file; wherein
   acquiring the plurality of image frames and the plurality of photographing state parameters respectively adopted when photographing the plurality of image frames comprises:
      acquiring the plurality of image frames and device motion parameters respectively adopted when photographing the plurality of image frames; wherein
   determining the zoom ratio corresponding to the plurality of photographing state parameters according to the preset corresponding relationship between the plurality of photographing state parameters and the zoom ratio comprises:
      respectively determining the zoom ratio corresponding to respective device motion parameters according to a preset corresponding relationship between the device motion parameters and the zoom ratio; and wherein
   acquiring the device motion parameter adopted when photographing any image frame comprises:
      acquiring a first proportion of the subject in any image frame and a second proportion of the subject in adjacent image frames of any image frame; and
      determining the device motion parameter adopted when photographing the any image frame according to change information of the first proportion and the second proportion.

2. The image processing method according to claim 1, wherein acquiring the plurality of device motion parameters when photographing the plurality of image frames comprises:
   acquiring motion information respectively detected by a motion sensor when photographing the plurality of image frames; and
   performing data analysis on the acquired motion information to determine device motion parameters respectively adopted when photographing the plurality of image frames.

3. The image processing method according to claim 1, wherein the image reference frame is any one of the plurality of image frames; alternatively, the image reference frame is an earliest or last photographed image frame among the plurality of image frames; alternatively, each of the plurality of image frames uses a previous image frame in the preset arrangement order as its own image reference frame, or each of the plurality of image frames uses a next image frame in the preset arrangement order as its own image reference frame.

4. The image processing method according to claim 1, wherein encoding the obtained plurality of target image frames into the video file comprises:
   determining a time order of photographing the plurality of image frames; and
   encoding the obtained plurality of target image frames into a video file according to the time order.

5. The image processing method according to claim 1, wherein encoding the obtained plurality of target image frames into the video file comprises:
   determining zoom ratios adopted for the plurality of target image frames, and sorting the plurality of target image frames according to a predefined zoom ratio sorting rule; and
   encoding the plurality of target image frames into the video file according to a sorting result.

6. The image processing method according to claim 1, wherein a same position of respective image frames is a central position of the respective image frames.

7. An electronic device, comprising:
   a processor; and
   a memory for storing processor-executable instructions;

wherein the processor implements an image processing method by executing the processor-executable instructions, the image processing method comprising:
acquiring a plurality of image frames obtained by photographing for a subject and a plurality of photographing state parameters respectively adopted when photographing the plurality of image frames, the subject being located at a same position of each image frame;
determining a zoom ratio corresponding to the plurality of photographing state parameters respectively according to a preset corresponding relationship between the plurality of photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and
zooming corresponding image frames according to the determined zoom ratio to obtain a plurality of target image frames, and encoding the obtained plurality of target image frames into a video file; wherein
acquiring the plurality of image frames and the plurality of photographing state parameters respectively adopted when photographing the plurality of image frames comprises:
acquiring the plurality of image frames and device motion parameters respectively adopted when photographing the plurality of image frames; wherein
determining the zoom ratio corresponding to the plurality of photographing state parameters according to the preset corresponding relationship between the plurality of photographing state parameters and the zoom ratio comprises:
respectively determining the zoom ratio corresponding to respective device motion parameters according to a preset corresponding relationship between the device motion parameters and the zoom ratio; and wherein
acquiring the device motion parameter adopted when photographing any image frame comprises:
acquiring a first proportion of the subject in any image frame and a second proportion of the subject in adjacent image frames of any image frame; and
determining the device motion parameter adopted when photographing the any image frame according to change information of the first proportion and the second proportion.

8. The electronic device according to claim 7, wherein the processor is configured to acquire the plurality of device motion parameters when photographing the plurality of image frames by:
acquiring motion information respectively detected by a motion sensor when photographing the plurality of image frames; and
performing data analysis on the acquired motion information to determine device motion parameters respectively adopted when photographing the plurality of image frames.

9. The electronic device according to claim 7, wherein the image reference frame is any one of the plurality of image frames; alternatively, the image reference frame is an earliest or last photographed image frame among the plurality of image frames; alternatively, each of the plurality of image frames uses a previous image frame in the preset arrangement order as its own image reference frame, or each of the plurality of image frames uses a next image frame in the preset arrangement order as its own image reference frame.

10. The electronic device according to claim 7, wherein the processor is configured to encode the obtained plurality of target image frames into the video file by:
determining a time order of photographing the plurality of image frames; and
encoding the obtained plurality of target image frames into the video file according to the time order.

11. The electronic device according to claim 7, wherein the processor is configured to encode the obtained plurality of target image frames into the video file by:
determining zoom ratios adopted for the plurality of target image frames, and sorting the plurality of target image frames according to a predefined zoom ratio sorting rule; and
encoding the plurality of target image frames into the video file according to a sorting result.

12. The electronic device according to claim 7, wherein a same position of the respective image frames is a central position of the respective image frames.

13. A non-transitory computer-readable storage medium having computer instructions stored thereon, wherein the instructions, when executed by a processor, implement an image processing method, the method comprises:
acquiring a plurality of image frames obtained by photographing for a subject and a plurality of photographing state parameters respectively adopted when photographing the plurality of image frames, the subject being located at a same position of each image frame;
determining a zoom ratio corresponding to the plurality of photographing state parameters respectively according to a preset corresponding relationship between the plurality of photographing state parameters and the zoom ratio; wherein after zooming the image frame obtained by photographing under the corresponding photographing state parameter by the zoom ratio in any corresponding relationship, a size of the subject in a zoomed target image frame is consistent with a size of the subject in an image reference frame; and
zooming corresponding image frames according to the determined zoom ratio to obtain a plurality of target image frames, and encoding the obtained plurality of target image frames into a video file; wherein
acquiring the plurality of image frames and the plurality of photographing state parameters respectively adopted when photographing the plurality of image frames comprises:
acquiring the plurality of image frames and device motion parameters respectively adopted when photographing the plurality of image frames; wherein
determining the zoom ratio corresponding to the plurality of photographing state parameters according to the preset corresponding relationship between the plurality of photographing state parameters and the zoom ratio comprises:
respectively determining the zoom ratio corresponding to respective device motion parameters according to a preset corresponding relationship between the device motion parameters and the zoom ratio; and wherein
acquiring the device motion parameter adopted when photographing any image frame comprises:
acquiring a first proportion of the subject in any image frame and a second proportion of the subject in adjacent image frames of any image frame; and determining the device motion parameter adopted when photographing the any image frame according to change information of the first proportion and the second proportion.

* * * * *